March 26, 1929.  R. H. UPSON  1,706,830

DIRIGIBLE

Original Filed April 30, 1923  6 Sheets-Sheet 1

FIG. I.

WITNESSES:

INVENTOR.
RALPH H. UPSON
BY
his ATTORNEY.

March 26, 1929.     R. H. UPSON     1,706,830
DIRIGIBLE
Original Filed April 30, 1923     6 Sheets-Sheet 2
FIG. II.
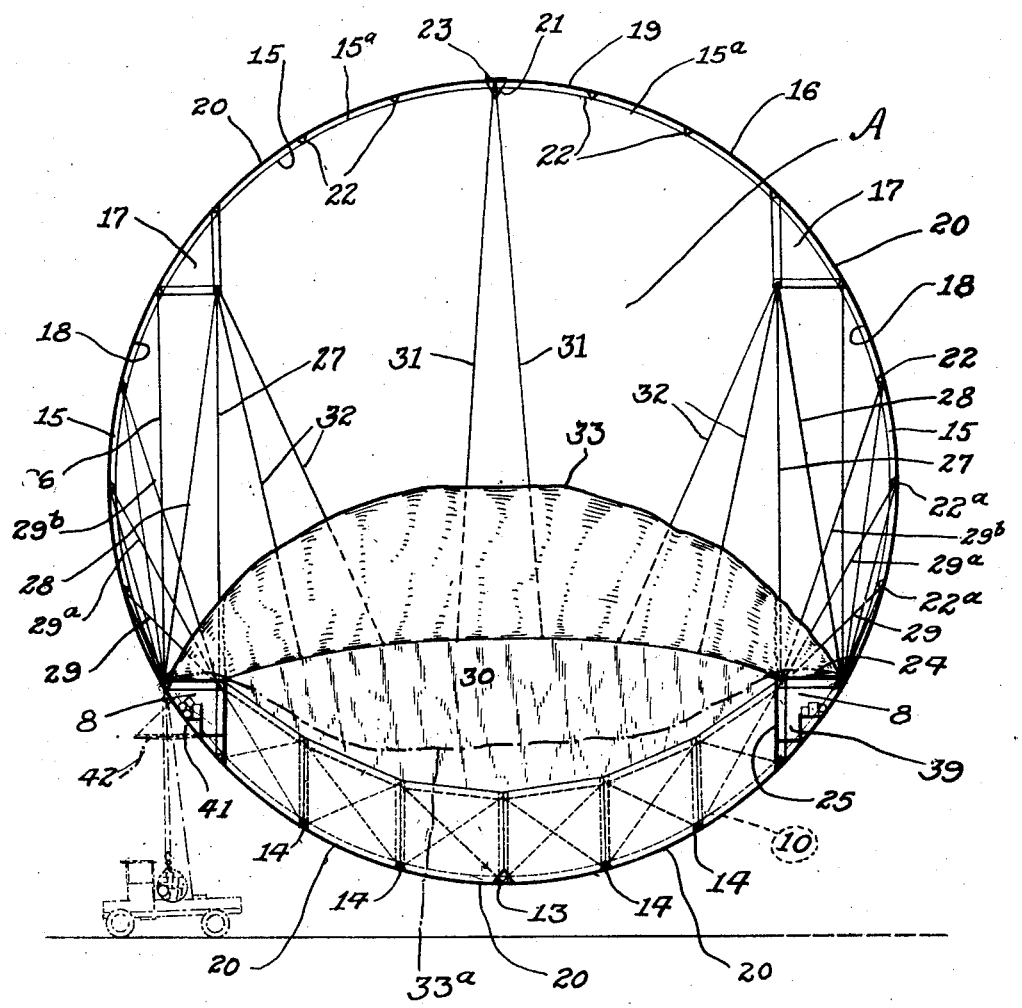
WITNESSES:
INVENTOR.
RALPH H. UPSON
BY
his ATTORNEY.

March 26, 1929.  R. H. UPSON  1,706,830
DIRIGIBLE
Original Filed April 30, 1923  6 Sheets-Sheet 3
FIG. III.
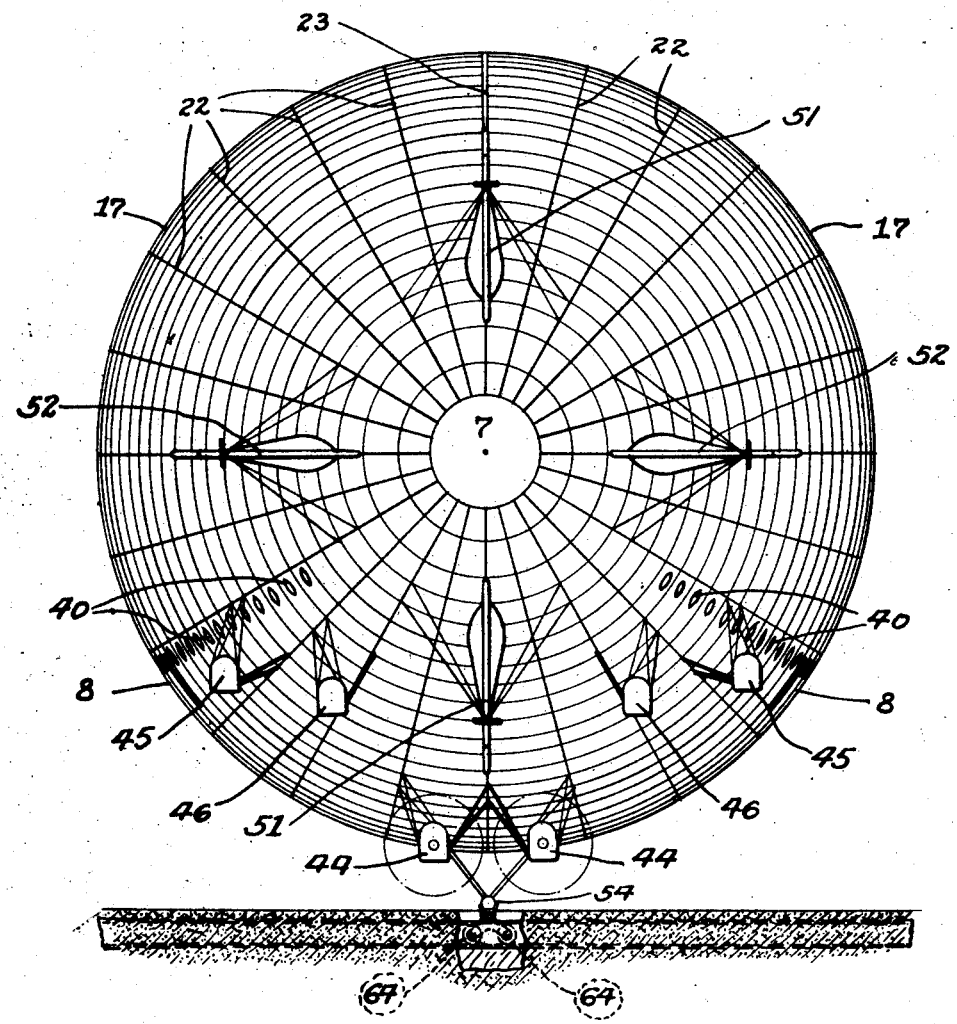
FIG. III A.
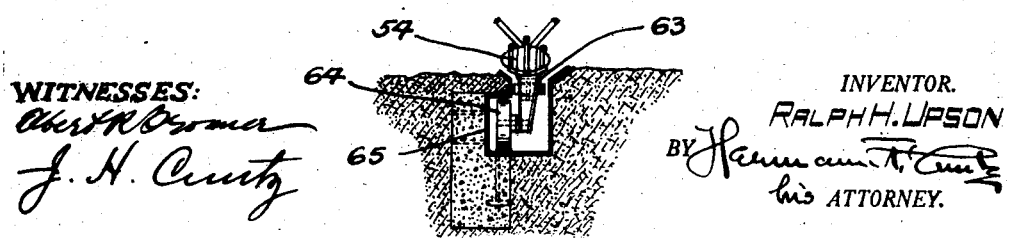
WITNESSES:
INVENTOR.
RALPH H. UPSON
BY
his ATTORNEY.

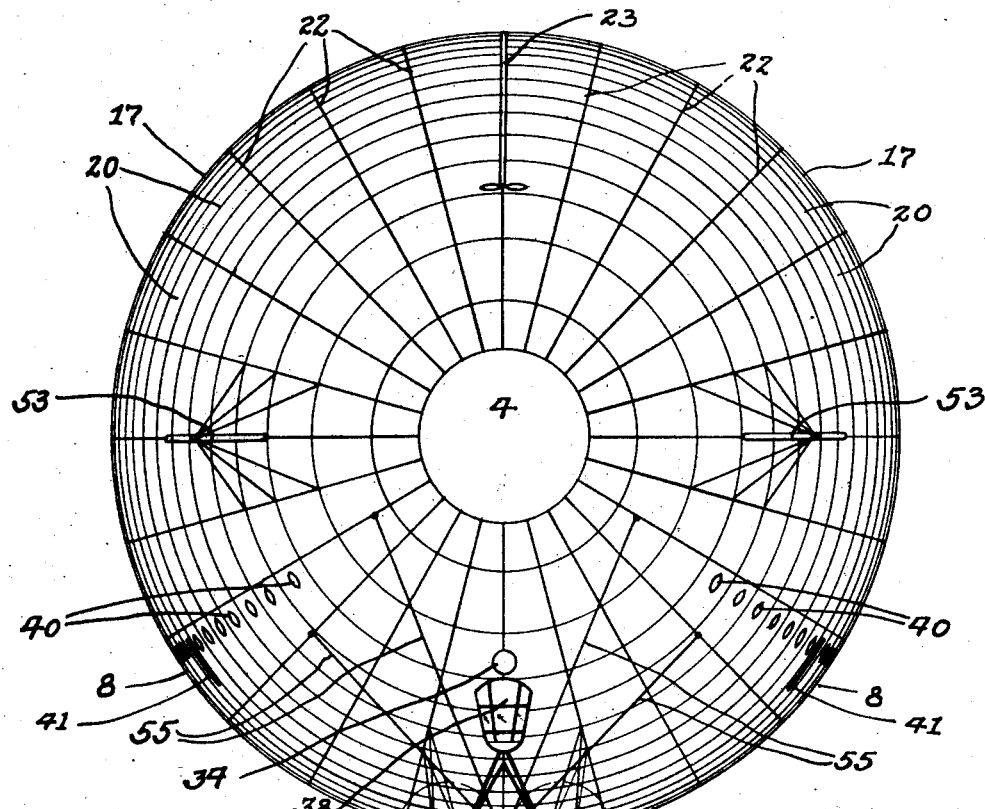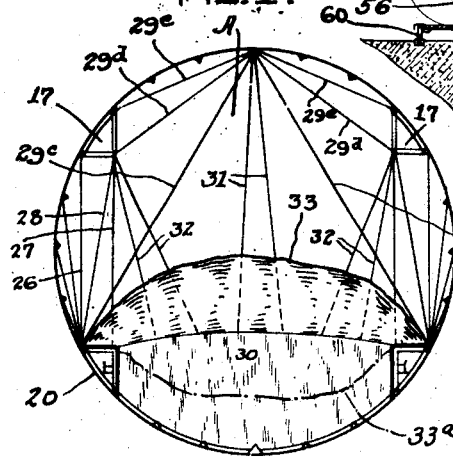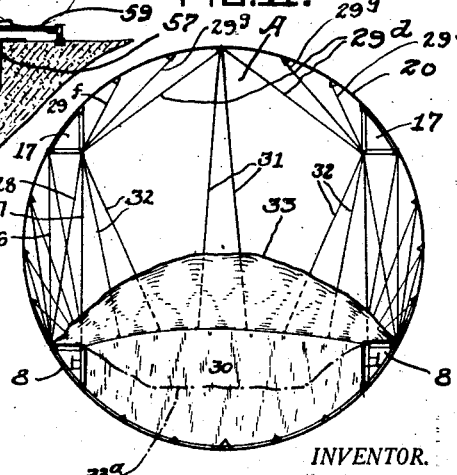

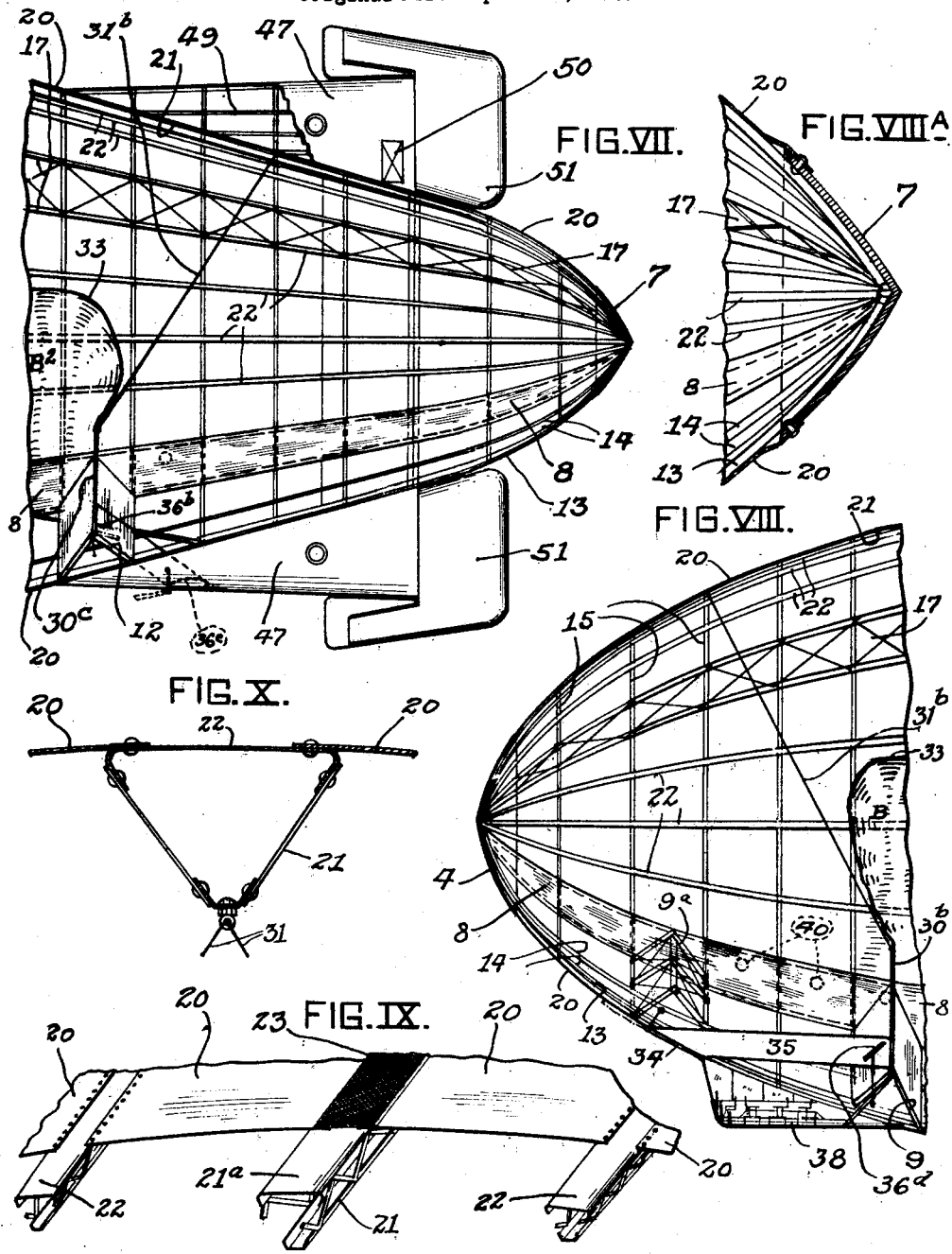

March 26, 1929.     R. H. UPSON     1,706,830
DIRIGIBLE
Original Filed April 30, 1923     6 Sheets-Sheet 6
FIG. XI
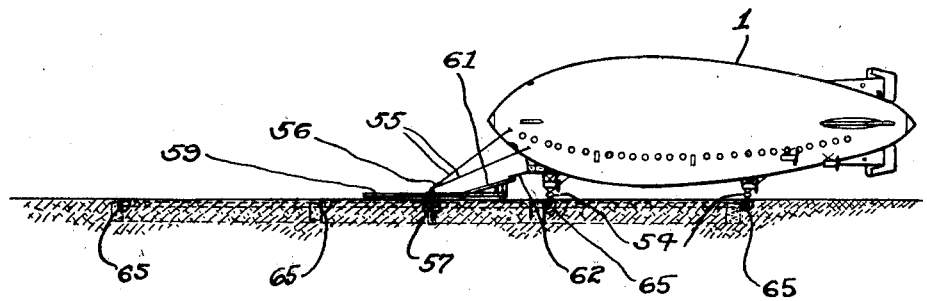
FIG. XII.
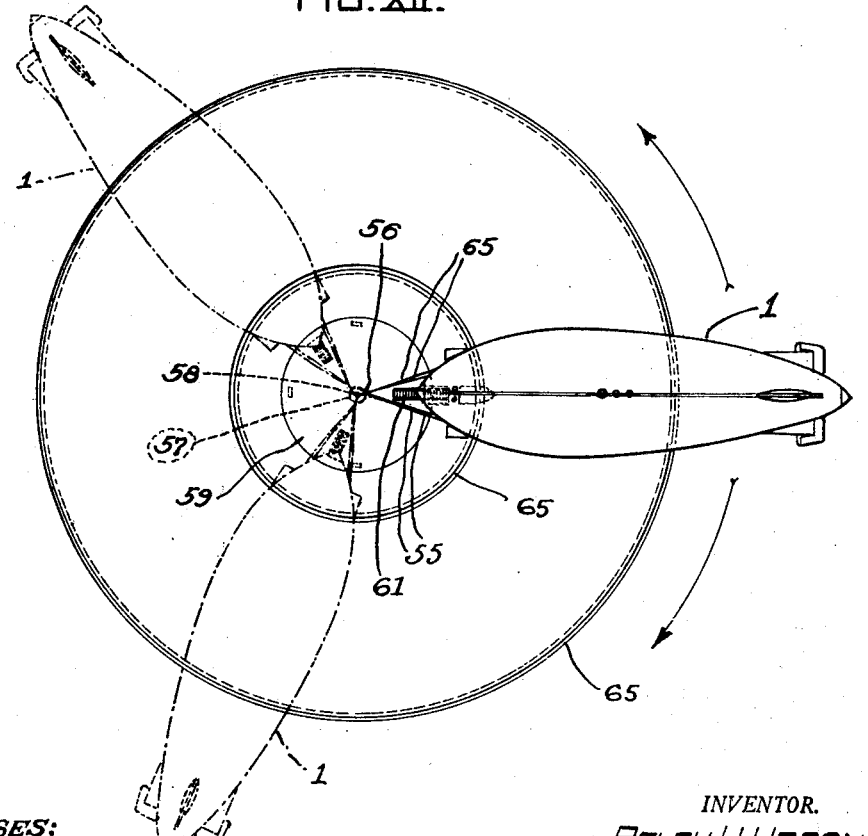
INVENTOR.
RALPH H. UPSON
BY
his ATTORNEY.

Patented Mar. 26, 1929.

1,706,830

UNITED STATES PATENT OFFICE.

RALPH H. UPSON, OF BIRMINGHAM, MICHIGAN, ASSIGNOR TO AIRCRAFT DEVELOPMENT CORPORATION, OF DETROIT, MICHIGAN, A CORPORATION OF MICHIGAN.

DIRIGIBLE.

Application filed April 30, 1923, Serial No. 635,410. Renewed April 12, 1927.

This invention relates to dirigibles which are now generally termed airships. It involves the design and construction of such aircraft with particular reference to structural efficiency, as well as matters of production of material and its assembly, and the adaptability of the design and construction for varying service and for different sizes of ships. Likewise, among the particular objects are the production of a rigid structure which is equal to all requirements of strength in flight, with ballonets capable of any desired expansion, and the structure well adapted for outside mooring, while capable of being built literally all metal so far as it relates to any portions of the structure where inflammable material might otherwise catch fire.

More particularly the underlying basis of the invention may be termed a metal-clad airship, that is having a metal envelope serving to hold the gas as well as to carry a fair share of stresses as an integral part of the structure.

As the mooring of an airship involves different strains from those incident to the stresses due to cruising under its own power or the normal load and lift strains, a feature of the structural unit must, for practical advantages, be in harmony with the requirements of the particular mooring system used.

It will thus be seen that the inventions involves the coordination of the entire structure for the lifting strains as well as the load, the mooring strains and the strains incident to operation, both on the entire hull and on the parts in proximity to the power-maneuvering and control elements.

The invention must not be confounded with previous descriptions which have merely suggested the idea of a metal hull or sheathing for dirigibles, which in any previous case in the art have been wholly impracticable for numerous reasons. Some have suggested a complete rigid frame work with metal sheathing and with interior gas bags, which simply adds the weight of the rigid structure to the weight of the gas bags. In some a complex structure aims to provide cylindrical rigidity as a whole, and if otherwise feasible would have supplied vastly excess strength in certain zones in order to provide the minimum of strength in other parts of the hull. This was due to a duplication of structural and envelope weight, or else entirely ignoring the structural interrelation of sheathing to the lines of the ship. On the whole previous suggestions in no way serve to enable one skilled in the art to produce even a practically operable dirigible even though aided by the great advance in the reduction in weight with increased strength of alloy metals, but in any event the combined suggestions would not have in any way made possible the design and construction aimed at by the invention set forth herein, comparable in any degree with the structural efficiency attainable by the practice of the inventions herein disclosed.

The mere suggestion of metal plates for the purpose of having a non-inflammable outer envelope is non-productive of any practical results unless this is combined with other factors. It became necessary to devise means for interconnecting the lift and the load through the medium of the envelope itself, and, furthermore, to establish relations of the entire structure which would insure a balance of the strains in the lower load portion, and in the sides and top or roof-lift portions of the hull, so that full advantage can be taken of the structural efficiency basicly possible with thin and light metal sheathing.

As will hereinafter appear, the invention in some respects apply particularly to rigid dirigible designs in which there is no truly cylindrical portion of the ship, but in which the longitudinal or meridian lines have a curvature from end-to-end, and the particular structural efficiency may have its particular advantage in cases of a critical relation of the maximum radius of curvature of the meridian lines to the transverse section.

While twenty years' practical operation of rigid dirigibles resulted in refinements, even without change of general construction and type, that have practically doubled the structural efficiency, the invention herein set forth may be assumed to start on the basis of a structural weight equal to one-half of the total lift, which is generally in accord with the best practice in contemporary designs of dirigibles of other types, but the inventions herein described will be susceptible of great structural efficiency in practice, or this factor of advantage in design may be reflected in many other ways, as, for example, the attainment of greater speed through the capacity to carry greater power, or the use of large factors of safety.

The detailed description of the structural arrangements for mooring, and the ground arrangements for mooring, it will be seen are in marked contrast with the attachment difficulties involved in the now well known mooring mast or tower, as well as the difficulties of a ship riding at its moorings from the now known mooring mast.

Many cardinal factors underlie the detailed working out of the design of each specific airship involving my invention, but the various features and combinations, it is believed, will be appreciated from the specific embodiment hereinafter described in detail.

While substantially every airship will be subject to many variations both in general and in detail, my inventions will be described with reference to one particular embodiment of an airship, shown in the accompanying drawings in which:

Fig. I is a side elevation with a fragmentary vertical section shown amidships.

Fig. II is a cross-section on line 2—2, Fig. I.

Fig. III is a rear elevation of the airship when moored.

Fig. III<sup>A</sup> is a cross-section of a mooring rail embedded in the ground with a fragmentary part of the ship connected.

Fig. IV is a front elevation showing the airship moored, with cross-section of the mooring post.

Fig. V is a cross-section of the ship with slightly modified arrangement of internal bracing.

Fig. VI is a cross-section of the ship with slightly modified arrangement of internal bracing.

Fig. VII is a vertical section of the stern portion with fins and rudders partly in elevation.

Fig. VIII is a vertical section of the bow portion or nose on the axis of a ship.

Fig. VIII<sup>A</sup> is a vertical section on larger scale, of a nose-plate.

Fig. IX is a fragmentary view in perspective, of the longitudinal beams and metal sheathing at and adjacent to mid-roof section.

Fig. X is a cross-section on an enlarged scale, of a longitudinal beam, such as the top roof beam with portions of the metal sheathing or plates and the attachment of suspender wires.

Fig. XI is a side elevation of the ship as moored with mooring equipment and adjacent ground in vertical section.

Fig. XII is a bird's-eye view of the ship moored with the mooring table and mooring tracks, and alternate positions shown dotted, to indicate different riding positions of the ship.

From these drawings it will be seen that the design and construction involve a contour of ship in which the meridian lines 1—1 have an appreciable curvature amidships, accentuated at 2 to a more abrupt curvature 3 merging into the nose 4, while the meridian lines astern converge as at 5, though of a lesser curvature locally, finally joining after a more abrupt curvature 6 into the stern-cap 7. The cross-section at all parts is substantially circular, as shown in the cross-section views, and the balance of lift and load strain is accomplished in such a manner as to maintain the substantially circular form with structural efficiency and all requirements of rigidity, both from internal stresses as well as from strains from the outside in operation, or due to particular stresses involved when the ship is moored.

The lower portion of the hull comprises a rigid structure from end-to-end and from the bottom substantially throughout, approximately, sixty degrees to each side. This is accomplished by two longitudinal keelson trusses 8—8 extending from end-to-end of the ship with main transverse trusses 9, 10, 11, 12, which connect the keelson or keel trusses, which we will hereinafter refer to as the "lower keelsons". Between these keelsons are longitudinal beams which may be termed sub-keelsons 13, 14, 14, which are rigidly connected with the transverse trusses, and converging from amidships with the bow and stern lines of the ship, these sub-keelsons extend into the nose and stern-cap, where they are rigidly connected in a suitable manner. At the ends these longitudinal members may be tapered in size and some of them may be slightly shorter, but, in any event, bringing all of the longitudinal members to a rigid inter-connection at or adjacent to the ends. Intermediate the main transverse trusses there are ribs 15, 15, which are frame members serving the usual purpose of ribs to support the plating or sheathing of the lower hull section from the lower keelson of one side to the lower keelson on the other side, but continuing around the equatorial circumference of a ship to support the sheathing and interconnect the upper structure above the stiff lower section of the hull. However, in certain parts of the ship or in certain designs not all of the ribs 15 need to continue. They may not all extend above the lower keelson trusses or they may be of different section. They may be closer together in parts of a ship, as, for example, in the bow and stern to provide for increased local strength of surface structure or connection of parts.

This lower shell of the ship extending from end-to-end, and from the lowest point of the hull up each side approximately sixty degrees, thus constitutes a substantially rigid main part of the dirigible. The lower keelson trusses are of such size and design that they have a spacious compartment throughout their major length and therefore constitute a live-load carrying space, while the main transverse trusses provide space that may be utilized for live loads such as freight, fuel, etc. These large longitudinal and transverse trusses may be entirely separated from the interior of the hull by fairing the sides of the trusses, that is by covering them completely with metal sheathing with the seams made airtight, throughout all sections of the trusses where it is desired to protect the interior of the trusses from any connection with the interior of the hull, thus leaving the ballonets airtight and separating the trusses from the gas space wherever gas is in proximity to the trusses, as, for instance, near the ends of the longitudinal trusses and in the case of the end transverse trusses.

A second major portion of the ship is in effect a top shell resisting the lift strains. This, as a whole, may be called the upper hull comprising the dome shell 16 with the upper keelson trusses 17, 17, while between the dome and the lower keelson trusses are the side sections 18, 18. The dome has the upper keelson trusses 17 extending from end-to-end following the meridian curvature, and may be tapered at the ends where they converge into the nose and into the stern-cap. The curvature of these trusses, incident to the general design and proportions of the ship, substantially constitute an upper hull segment rigidly connected at either end with the lower rigid segment or the lower hull of the ship, but in themselves these upper keelson trusses are not self-supporting except in conjunction with the dome sheathing 19, 19 which extends completely around the top of the hull and is made of thin metal sheets 20, 20, with ribs 15ᵃ in a circumferential direction, and longtiudinal beams 21 and 22, 22 which may be of uniform section and design, although the topmost longitudinal beam 21 is preferably of larger section so that its outer face 21ᵃ is of sufficient breadth, and the beam of ample strength, to support a runway 23 on the top extending, for example, from the rear rudder fin as far forward as desired. With the dome sheathing and the upper keelson trusses the lift section of the upper hull may be regarded as the second or upper segment connected with the lower segment or lower hull at its ends, and to complete the structure the sides 18, 18 form meridian sectors broad amidships and converging fore and aft and formed of longitudinal beams 22ᵃ, 22ᵃ, with suitable ribs 15 on the outside of which the thin metal sheathing is secured to the outer faces of said beams or the outer faces or legs of the ribs, thus forming gastight sides which are contiguous with the dome of the upper hull and which are gas and airtight at their junction with the lower keelson trusses or the fairing 24 covering the lower keelson trusses.

The side sheathing segments are, generally speaking, in a horizontal zone that is subject to lift and load with varying strain conditions within the limits of the general dimensions and design, so that the side sectors are treated as to their strain-resisting factors in a different way from the dome or the lower hull, with the object of the greatest structural efficiency to meet the strain conditions of the sides of the upper hull. This is accomplished by suspenders 26, 27, 28 which distribute the load of the lower keelson trusses to the upper keelson trusses, and brace wires 29, 29ᵃ, 29ᵇ, etc., which distribute the load to the other longitudinal beams 22ᵃ, 22ᵃ, in the side sections of the hull. The distribution of load in these various suspenders is so arranged as to produce a tangential stress in the metal sheathing in approximate proportion to the head of gas at all points, thus maintaining a natural tendency to a circular shape. Any departures from the ideal in this respect, including all stresses normal to the surface, are carried by the longitudinal beams and ribs which form the support for the metal sheathing.

The internal construction within the shell of the hull, in the particular embodiment shown, comprises the gas space A and ballonets B, B¹, B². This provides for controlling the air space in the ship with respect to the volume of the gas.

The ballonets comprise single partitions 30, 30ᵃ supported by suspender wires 31, 31 and 32, 32 connected substantially equidistant along the top edge of the single partition, but any of these suspenders may be branched as at 31ᵃ, 31ᵃ a suitable distance above the partition edge. Attached to the top of each partition wall is the ballonet fabric 33 which swells out with an ample area of material to permit the collapsing of the ballonet into the lower hull, or as in dotted position 33ᵃ, and also to distend to the dotted position shown in Fig. 1.

The front end of the forward ballonet and the rear end of the stern ballonet may each have a short partition section 30ᵇ, 30ᶜ held in a predetermined but yielding position by brace wires 31ᵇ, 31ᵇ, and these brace wires also serve to prevent any excessive bulging, respectively forward or rearward of the fabric of the end ballonets.

A "breather" 34 involves a hole in the forward skin at a point suitable for this purpose, with the breather pipe 35 and valve 36 suitably actuated from the control car, thereby providing for ingress of air to the forward ballonet space B. Valve 36ᵃ provides for the passage of air from the ballonet B to ballonet B¹ and is controlled by means 37 from the interior of the transverse truss 10, while similarly a breather valve 36$^b$ is formed in the partition 30$^a$ between ballonets B$^1$ and B$^2$. In conjunction with the breather pipe and the breather valves, suitable operating mechanism is provided, voluntary, or where desired automatic, for the purpose of the usual methods of lift control, including discharge for gas and air, with any blowers necessary to fill or exhaust the ballonet spaces in any manner desired. It will thus be seen that in the case of a non-deformable shell, as shown in the drawings illustrative of one form of combination of my inventions the breather supplies air pressure to the ballonet substantially in accordance with the speed of the ship, so that the internal pressure below the diaphragm is transmitted to the gas and thereby builds up an internal pressure directly against the inner surface of the skin of the ship because such skin of the ship constitutes the envelope; and thus this pressure is built up concurrently with any external pressure against the outside of the skin of the ship due to aerodynamic forces in operation, that is, in flight, or when moored with a head wind. This provides an automatic substantial compensation for such forces with varying altitude because the expansion of gas deflects the diaphragm without the necessity of valving gas, because the inflow of air with a relative wind depends upon the gas pressure, while, as previously stated, various arrangements of valves and blowers controlling the air under the diaphragm or sections of diaphragm provide for many extraordinary conditions, or to effect special maneuvering, because of the non-collapsible envelope, or particularly the lift portion or dome thereof being subject to direct outside pressure and internal lift pressure.

The manning of the ship and handling of passengers and freight involve, in the first place, the control car 38 positioned well forward and in direct communication with the interior of the transverse truss 9, thereby having interior communication with all of the load-carrying space, quarters and corridors or runways for crew. Fairing, as desired, surrounds the structure of control car portion within the sheathing of the hull. The lower keelson trusses have the large space 39 for cabins, compartments or gallery, and at suitable intervals port holes 40, or windows may be provided, the sheathing at this point not being necessarily airtight, because of the fairing around the top and inner wall of each truss. This makes the interior of these truss galleries entirely separated from the inside of the ship, and with their outer side free to be used for light and air, and for hatches or any other means of ingress and exit. The outer side may be sponsored or formed in any desired manner best adapted for load or passenger occupancy, without in any way affecting the structural unit of the lower hull or its inter-connection with the upper hull so far as the hull stresses and strains are concerned. Hatches 41, 41 serve to form companionway connections or loading side hatches, as, for example, with a drop door 42, shown dotted in Fig. 2, to which access may be had by any desired means such as hoist, elevated platforms or any other ground equipment at the stations or terminals.

A pair of forward power cars 43, 43 and rear lower cars 44, 44, with rear lateral power cars 45, 45 and stern power cars 46, 46, comprise in all cases suitable fuselage to carry engines and equipment with their propellers and space for attendants. Three of these pairs of cars are reached by ladder from the main transverse truss galleries, and the lateral cars are each in close proximity to one of the lower keelson trusses and accessible therefrom. The position of all the power cars, it will be seen, is such that their suspension and bracing extend from main trusses of the lower rigid shell of the ship, that is from the lower hull, thereby providing most suitable means of support of their load, and also transmitting all controlling strains of the lower units directly to the stiffest parts of the hull structure.

The stern is provided with top and bottom fins 47 and lateral fins 48, by framework such as 49 rigidly connected with the longitudinal beams and with the ribs which may be provided at more frequent intervals in the rear section of the ship in order to give all the desired rigidity and stability to the fins and to transmit all strains their functioning incurs. These fins, or at least the upper and lower fins are of dimensions providing internal space or compartment, with outside sheathing, ample for the work of the crew incident to any inspection or repair, for which side hatches, such as 50, may be provided to permit exit for inspection of the outside operating parts, and also to provide access to the runway leading over the top meridian line of the ship.

The rear edges of the fins carry in suitable manner rudders 51, 51 and elevating fins 52, 52, while the desired mechanism for manipulating the horizontal and vertical rudders is suitably housed in the fins accessible for inspection and repair. Bow fins 53, 53, if carried, are positioned where they best serve their purpose, and are interconnected with the ribs and longitudinal beams, thus providing the necessary strength to carry all strains involved.

Below the power cars 43 and 44, suitable struts carry two landing buffers or skids 54, 54, which are in the nature of shock absorbers to resist any sudden impact with the ground. These buffers may be used to form the interconnection with the mooring equipment, which will now be described.

The structure of this airship is such that mooring strains from mooring lines near the bow may be advantageously carried through the rigid lower hull structure. Thus mooring lines 55, 55 run from hawse holes accessible from the forward gallery of the lower keelson trusses and preferably are hitched to a single mooring bridle 56, which by any suitable winch or other means is rove through the eye of the mooring post 57 which is a fixture at a suitable point in the landing field at terminal or station. This mooring post may be made with telescoping shaft or base 58, so that when not in use the mooring eye can be lowered into the ground and the hole covered up, thereby leaving a perfectly flush field.

Surrounding the mooring post a platform or turntable 59 being countersunk in the ground if desired, runs on circular track 60 and has a ramp 61 extending upward and radially outward from the centre of the turntable with suitable inclination and suitable dimensions and platform space, so that it will readily accommodate a gangway 62 to connect it with the front of the control car. In this manner the mooring lines 55 diverge from the centre of the turntable, thereby leaving a convenient space for use of the ramp and gangway for entering and leaving the ship, particularly for passengers, and also for the crew and loading.

In conjunction with this method of mooring lines and bridle, suitable points on the lower portion of the ship are provided for keeping the hull on a level keel on the ground. As herein shown, the buffers 54 are clamped to a trolley 63 with trolley wheels 64, 64 running on a channel rail 65 embedded in the ground. Two of these channel rails are placed circularly around the centre of the mooring post, and at suitable radii to accommodate the relative position of the two points of attachment at the lower part of the hull as designed for any particular ship. When so attached the two widely separated points of attachment assure the horizontal alignment and distribute any lifting strains well over the hull structure, while the point-attachment at the ground mooring post, with a suitable swivel or actual turning of the mooring post, permits the ship to ride at anchor "with the wind." When thus moored to the ground the strains involved in air-resistance are transmitted by the mooring lines to a most suitable part of the rigid structure, and any variation in buoyancy is held in restraint by the connections between the cars and circular riding rails, while any strains thus involved are likewise transmitted to the structurally robust parts of the hull.

The structural requirements of the relation between the lower hull and the upper hull may be further appreciated by reference to Fig. V and Fig. VI, where the circumferential ribs are omitted from the upper hull. In Fig. V the dome of the upper hull is connected by brace wires $29^c$ from the ridge longitudinal beam to the outer side of each of the lower keelson trusses, and the upper keelson trusses are also connected by brace wires $29^d$ and $29^e$ to the ridge beam, while the lower portion of the upper keelson trusses are connected by suspenders 26, 27 and brace wires 28. These various brace wires and suspenders thus transmit the lift strain of the dome to the lower hull and prevent circumferential distortion.

In this arrangement it will be seen that the lower keelsons and the longitudinal trusses just above them give structural support for the load strains, in that part of the ship where the pressure due to the head of gas may be slight or may be negative, in the case of inflation of the ballonets beyond the level of the longitudinal trusses. The upper hull has a pressure due to the head of gas above the level of the ceiling of the ballonet space, plus whatever air pressure is in the ballonets. The wires, in conjunction with the longitudinal beams and any circumferential ribs serve to support the load and meet the variable pressure in the upper hull, with the minimum of structural weight for required strength. The sheathing or metal plates may, of course, be subject to a slight bulging between the longitudinal beams, but the longitudinal beams extending from end-to-end, with the curvature of the entire hull, resist distortion and transmit strains to the interconnections with the lower hull both at the ends and through the sides to the stiff lower quarter keelson trusses.

A typical modified section, shown in Fig. VI, involves the brace wires $29^d$, $29^g$, $29^f$, as additional means to assure the uniform transmission of strains from the dome to the upper keelson trusses or longitudinal beams relatively smaller in section. Under certain conditions additional brace wires like 28 may be used as a diagonal to the suspenders 26, 27, carrying strains from the side of the upper keelson trusses to the edge of the lower keelson trusses. With the brace wires as shown it is of course possible to reduce the size or section of upper keelson trusses 17, 17, because these brace wires serve to maintain the substantially circular form of the section of the entire upper hull without materially increasing the section of any of the longitudinal beams above the level of the lower keelson trusses.

It will be seen that the general proportions of the particular airship herein specifically shown and described, are approximately a length of three and a half times the maximum diameter. A ratio of diameter to length in this order, but not exceeding approximately four and a half to one, provides for a curvature of the meridian lines which converging at each end give certain relations of the lift and load strains which permit high structural efficiency, and still preclude any dangerous approach to critical compression strains in any longitudinal members in operation involved in the structure. While a certain leeway is permissible, the theoretical considerations with respect to the strains establish limits of the ratio, but the features of construction lend themselves most admirably to approximately the general proportions herein shown as not alone suited to the normal sailing strains, but also for the resistance to lateral outside wind forces as well as the mooring strains. The curvature in every portion of the meridian beams or members from end-to-end of the dome, provides for an inter-relation and coordination of the strains, when the circumferential relation of the stiff longitudinal elements is also provided for. This latter condition is met by the metal sheathing which, as a whole, takes the general curvature and forms a structure which in itself takes the lift, that is the pressure due to the head of gas, with the least amount of weight of material, or, in other words, with the greatest structural efficiency. This same structure properly coordinated, metal sheathing and other members as described, with the form of curvature of the roof, provide in all parts a convex surface suitably resisting pressure from the inside or outside. This dome construction, but particularly the roof section provides for the entire structural integrity of the ship by the connection of the roof section, converging from amidships toward each end, and its attachment at bow and stern to the lower rigid hull structure, but as an entirety it requires in addition the interconnection between the load structure and the lift or roof structure which is provided by the suspenders or brace wires. In the form shown in Fig. II cross-section, the lift of the roof is transmitted by suspenders from the upper keelson trusses to the lower rigid structure, and the main section of roof may be complete with circumferential ribs interconnecting the longitudinal members, plus the additional strength due to the sheathing. In the section shown in Fig. V, the roof section when without circumferential ribs, has its lift strains transmitted to the lower keelson trusses or load section, by brace wires direct from the ridge or top truss to longitudinal trusses in upper quarters on either side, or if desired two upper keelson trusses of relatively large size. In Fig. VI the roof strains are transmitted by brace wires from a plurality of the roof longitudinal beams or from every one of the roof longitudinals, to the upper keelson trusses, which in turn transmit the lift to the lower keelson trusses. These arrangements of load structure and interconnection with the lift or roof structure make possible the use of a minimum of material and at the same time the use of gastight sheathing as part of the structural integrity of the hull for strain purposes, as well as forming the sole gas-container, with a great reduction of weight as compared with other contemporary airship designs.

Underlying the general construction it will be seen that the more or less flexible metal sheathing forming the roof has the strains incident to maintaining its form transmitted to a longitudinal line or portion of the sheathing in the upper quarter on one side and the upper quarter of the hull on the other side. The stiff lower segmental structure or hull portion carrying the load broadens from each end toward the middle and the sides or lateral extremities, such as formed by the lower keelson trusses, being substantially in the lower quarter on either side, thereby provides for the carrying of the load by suspension wires located along the sides of the ship. These suspension wires may be close to the sides of the ship and admirably transmit the load direct from the broad lower structure directly to the outside sheathing.

The general rigidity is also greatly aided by the condition of the stiff longitudinal members and the longitudinally curved surface of the metal sheathing.

By the combination of elements of structure, the transmission of the strains is carried in a very different way and the stresses therefore balanced in a manner which is entirely different from what has heretofore been practiced. The change of general design thus provides for a basis for radically different distribution of stresses with the resultant advantage of securing the desired rigidity of the entire structure with much structural efficiency and with the various other advantages herein set forth and such as will be realized in the designing, manufacture and operation of airships containing these inventions.

The entire structure is made sufficiently rigid to keep its shape under all operating conditions, but the strength and weight to accomplish this are much reduced by the arrangement and adjustment of the suspension wires which make it possible to maintain an approximately circular section in an otherwise flexible surface. The slight flexibility of the sheathing and the flexibility due to strains will be evident if the arrangement and adjustment of suspension wires and longitudinal members were not provided, and these inherently may be provided with lightness and economy of strength owing to the underlying principle of design.

The use of a circular cross-section of envelope permits the internal pressure to be raised to any desired degree with no other strains in the general structure than those due to direct tension. This means that the pressure can be built up in proper proportion to the speed of the airship, so that the envelope sheathing will carry any or all of the hull stresses due to the areodynamic forces. This in turn means that in the extreme case, the strength of the framing need be only sufficient to maintain rigidity of the ship while at rest. It is not necessarily a semi-rigid, but a rigid airship which, by its proper combination and inter-relation of elements utilizes for strength purposes the pressure principle of a non-rigid airship.

Thus on account of the arrangement and disposal of elements of the structure, the single envelope carries direct tension due to load. It also carries compression due to bending moments, in conjunction with tension, and it carries the general shear stresses. The sheathing forms the sole means of confining the gas as well as the internal controlled air. The single envelope forms a smooth fairing of the hull and the complete metallic sheathing equalizes electric potential over the entire surface. It is a general protection against fire and sheds rain on account of being a complete gastight sheathing, and its metallic nature serves in the best form to tend to equalize troublesome differences in temperature.

It will be seen that the matter of air ballonets with a plurality located subject to suitable control, while in general not novel, admirably suits the conditions incident to the structure and the manipulation. Without varying the general construction or mitigating the advantages, the gas space may be subdivided for control instead of the air space or ballonet space. This would mean gastight partitions instead of the airtight partitions between the ballonet sections, but would not otherwise vary the questions of weight or other advantages.

It will be observed that owing to the metallic sheathing or hull envelope constituting a part of a structural unit to provide rigidity of the hull as a whole, the longitudinal members, as built up trusses or otherwise, lend themselves necessarily to a triangular form with one broad face of the triangle against or forming a part of the sheathing. In this way the generally triangular sectional character of the longitudinal members have their apex inward and their major structural strength farthest removed from the axis of the ship. This disposal of longitudinal members may be deemed characteristic of the combination of complete and sole metallic sheathing or envelope involved in these inventions, whereas the reverse of position of stiff trusses has heretofore been usual in rigid airship design.

In general, the coordination of the different novel features makes possible the building of an airship in which all necessary stresses are properly resisted and all strains interconnected with economy of material and with great convenience and advantage in arrangement for the useful purposes of the airship. Many of the individual features of invention may be combined differently than as shown specifically in the accompanying drawings and in the embodiment herein described in detail. While the underlying characteristics of an airship in use call for a smooth outer hull and a shape best adapted to the intended speed as well as wind pressures on the ship when moored or cruising, the present invention makes it possible to carry the load and lift strains close to the outer surface and thereby greatly minimize the necessary strength of the various members in order to properly meet all stresses. In other rigid airships of present construction there is in general the gastight fabric of many bags, extending both circumferentially and transversely of the ship, usually with netting to suitably confine the circumferential walls of the bags, combined with a self-sustaining cylindrical built-up structural frame throughout the ship forming a wall of some depth between the gas bags and the extreme surface of the hull, and in addition thereto any desired outside covering attached to the self-supporting structural frame work. In the practice of the inventions set forth herein, the radical contrast involves the carrying of the stresses on the extreme surface members by designing the metallic sheathing and the supporting of more rigid structural members so that the desired rigidity of the whole ship is well met with the strains all carried practically by the surface or extreme diameter of the hull, and at the same time eliminating the supplementary gas bag fabric and making the metal sheathing do the double duty with the resultant great saving. These conditions are in part met by having a relatively greater rigidity of lower structure, and having this load structure at the bottom of the ship extending amidships well up each side, so that the load suspension may be carried close to the sides of the ship and the lift strains so distributed directly to the sheathing throughout the dome and particularly the side sections to marked advantage.

With these general structural advantages the arrangement lends itself most admirably to a relatively large and commodious accommodation for passengers or freight, as well as for necessary operating supplies, without suspending cars, gondolas, or any excrescence of structures outside of the hull, in any manner that would add to the wind resistance. It also has the advantage of carrying passengers in a part of the ship not exposed to the danger of forced contact or impact with the ground.

The characteristics of this construction offer advantages of modified practice of mooring of ships. With the rapid improvement tending to greater reliability of airships, with metal envelope and the other advantages eliminating fire danger, and the constant improvement in various features, it is believed that the time is not far distant when an airship will remain in the open as a matter of course, and will have to be brought into a hangar only in great emergency or for general overhauling and special repairs, in general just as great vessels are kept at their moorings and are not put into drydock except in emergency or for general overhauling.

The construction of ship herein set forth provides for the mooring of an airship to great advantage. The mooring line strains carry to the most robust structural part of the ship and the structure is such that strains from wind resistance when moored will be properly transmitted and resisted throughout the hull. The structural factors which admirably provide for the accommodation of live loads such as passengers and goods, likewise lend themselves to a bottom connection to the ground. This contacting with the ground has its advantages in making a landing, with the live load accommodations, and particularly the passenger compartments remote from the ground contact elements specially suited for landing, and also admirably disposed to accommodate the handling of the ship or landing without any interference with the passenger space. After landing, like advantages attend the ship warped to the ground by the mooring lines and the ship bottom ground contacts with ample facilities for steadying lines if such are found desirable, in conjunction with means to permit suitable swing with the wind to avoid unnecessary and excessive lateral wind strains.

With the great advantage of bringing an airship close to the ground, the discharge and embarking facilities become greatly simplified. For practical use of airships the embarking and disembarking or loading or unloading are a factor of major importance. The mooring requirements as herein set forth and which are particularly applicable to the structural characteristics of the airship herein described, constitute therefore a solution with great advantage of one of the problems that heretofore has materially impeded the progress of practical airship use.

The mooring inventions herein described may be regarded independently, but they also lend themselves to peculiar advantages in combination with the airship structural characteristics of the new type herein set forth.

Many variations may be made in design and in combination, both as a whole and with respect to the various novel parts or features of combination, from the specific embodiment of construction herewith shown and described in detail. The material used for parts will of course be a matter of selection in the designing of any specific ship, or for the mooring arrangement or the combination. Each ship will likewise be the subject of detailed design in every respect to suit the particular requirements of service desired. The disclosures herein will make possible the construction of ships with all or many of the advantages as herein particularly pointed out, and other advantages will in the practice of my invention be realized.

Therefore without limiting myself to any specific feature of disclosure or the particular combination or combinations or design herein described and discussed,—what I claim and desire to secure by Letters Patent is:

1. An airship of substantially circular cross-section, a rigid hull structure forming a segment extending the length of the ship and from the bottom part way up the sides, stiff longitudinal members extending on meridian elements along the roof of the hull and secured at their ends to the lower rigid segment, interconnecting circumferential ribs, and gastight strain-resisting metal sheathing confining and directly resisting the pressure of the buoyant gas, and enclosing the meridian longitudinal members and ribs.

2. An airship of substantially circular cross-section, a rigid hull structure forming a segment extending the length of the ship and from the bottom part way up the sides, stiff longitudinal members extending on meridian elements along the roof of the hull and secured at their ends to the lower rigid segment, interconnecting circumferential ribs, a gastight strain-resisting metal sheathing confining and directly resisting the pressure of the buoyant gas, and enclosing the meridian longitudinal members and ribs, and ballonet diaphragms separating the rigid lower hull portion from the upper portion for the major length of the ship.

3. An airship comprising an airtight rigid structure forming a segment of the hull from end-to-end and from the bottom part way up each side, longitudinal meridian trusses curved throughout and secured at each end to the lower rigid structure, ribs extending from side-to-side of the lower rigid structure around the top of the hull, and gastight metal sheathing confining and directly resisting the pressure of the buoyant gas, and secured to said ribs and longitudinal meridian trusses.

4. An airship having a hull of substantially circular section, two longitudinal meridian trusses adjacent the hull surface converging at each end and separated amidships part way up the side of the hull below the middle, a plurality of transverse members rigidly interconnecting said trusses, a plurality of stiff meridian members converging at each end and secured to the two longitudinal lower trusses, an airtight metal sheathing confining and directly resisting the pressure of the buoyant gas, and encompassing the outside of said meridian members and secured thereto to form strain-resisting interconnections therewith.

5. An airship comprising a strain-resisting and airtight shell sheathing, a rigid load-carrying structural portion forming an integral part of the lower segment of the ship's hull, a plurality of longitudinal members formed with the hull surface in the upper half of the hull, and converging from the maximum diameter toward the ends and having connections with the longitudinal members of the load segment, a plurality of suspenders extending from the sides of the load segment upwards and each in a plane of vertical cross-section of the ship and attached at plural points on the inside of the upper half of the hull shell.

6. An airship comprising strain-resisting and airtight all-metal shell, a rigid load-carrying structure forming a lower hull segment, a plurality of upper longitudinal members conforming to the hull surface and connected at each end with the lower rigid load section, a plurality of suspenders extending from the sides of the rigid structure upward to plural points of attachment on the inside of the upper shell portion.

7. An airship having a hull skin of substantially circular cross-section and meridian hull lines curved inwardly throughout their length, comprising a lower hull segment of rigid construction to support useful load, an upper lift section contiguous with the lower hull segment at the sides of the load section and formed of gastight metallic sheathing, a plurality of circumferential members of more rigid construction than the metallic sheathing and supporting the hull sheathing in its substantially circular cross-section in conjunction with a ballonet and breather supplying internal pressure to substantially compensate outside and inside aerodynamic pressure on the skin and increase the strength of the envelope against aerodynamic forces.

8. An airship having a hull with substantially circular cross-section and having its meridian lines throughout the lift portion of the hull curving inwardly toward the axis of the ship throughout their length, metallic sheathing throughout the lift portion of the hull in a meridian direction forming the skin and buoyant gas envelope, rigid structures associated with the hull on each lower quarter for useful and concentrated load support, and a plurality of stiff structural members united to the hull skin on the interior thereof each lying in a transverse section of the ship and extending from the load structures at the lower quarters throughout the lift portion of the hull and interconnected in the plane of the skin of the hull with stiff shear-resisting means.

9. An airship having a substantially circular cross-section and a surface longitudinally curved throughout its length, comprising a lower load segment of rigid construction from end-to-end and extending substantially to the lower quarter on each side amidships, an upper lift section contiguous with the load section and formed of gastight metallic sheathing throughout constituting the buoyant pressure resisting skin, a plurality of suspension wires extending from along the edge of the load section to plural points on the interior of the lift section, and a plurality of meridian members associated with the sheathing and secured at either end to the ends of the load section.

10. An airship comprising a contiguous metal sheathing forming the upper portion of the hull and constituting a nondeformable envelope to confine the lift pressure medium, a flexible diaphragm attached to the interior of the hull at or below the middle on substantially horizontal lines extending throughout a major portion of the ship's hull and separating the gas-space from a lower air chamber, an air inlet in the ship's hull providing means to supply air and build up pressure in the air chamber and to augment the gas pressure, whereby aerodynamic pressure on the outside of the hull is in general compensated by pressure in the chamber and the strength of the envelope against aerodynamic forces is increased.

11. An airship comprising a complete upper portion of metal sheathing forming the closure for the lift medium, a rigid lower structure extending from end-to-end and secured at either side remote from the middle amidships to the sheathing, a horizontal diaphragm throughout a major portion of the ship flexibly separating the plane of the rigid structure from the gas space, and a plurality of longitudinal members throughout the upper portion associated with the sheathing extending from end-to-end and connected to the ends of the rigid lower structure.

12. An airship comprising a complete contiguous metal sheathing forming the upper portion of the hull and the confining envelope for the lift medium, stiff longitudinal members on meridian lines having continuous inward curvature attached to said sheathing, a plurality of stiff transverse members connected with the inner surface of the sheathing, a generally horizontal flexible diaphragm in the lower portion of the ship's hull separating the lift medium from an air chamber in the hull below and adapted to swell vertically and maintain a pressure on the gas in proportion to the pressure of air in the chamber, a breather in the hull of the ship connecting with the air chamber to provide pressure therein in proportion to the air pressure at the intake, whereby the stiff lift medium envelope has pressure on its inner surface maintained generally to compensate the pressure on the outer side of the envelope and increase the strength of the envelope against aerodynamic forces.

13. An airship having a hull of substantially circular cross-section comprising a complete metallic sheathing forming the hull skin and the buoyant gas confining envelope, a plurality of flexible diaphragms below the middle of the ship having gastight connections on substantial horizontal lines of the interior of the hull, a breather to admit air below said diaphragm and means to build up pressure in the chamber below said diaphragm and controlled interconnecting means between said chambers, whereby the internal pressure of the gas may be regulated by pressure in said air chambers, for the purpose described.

14. An airship comprising a complete upper hull portion of metal sheathing of substantially non-deformable cross-section forming the lift-pressure resisting portion of the envelope for the lift medium, a generally horizontal flexible diaphragm in the lower portion of the ship cooperating with a rigid lower air-confining skin, an air inlet positioned to be subject to the pressure of relative wind and means to control the upbuilding of air pressure under the diaphragm and in turn to control the internal gas pressure within the hull.

15. An airship of substantially circular cross-section and having a length not exceeding approximately four and a half times its maximum diameter, comprising a lower rigid segmental section extending from the bottom laterally to the quarter on both sides and converging at the ends, circumferential members extending over the upper portion and longitudinal members interconnected therewith and converging at each end to a connection with the lower segmental structure, and a sole gastight sheathing associated with said longitudinal members and said transverse members and constituting the direct buoyant gas-resisting medium for the ship.

16. An airship of substantially circular cross-section and having a length not exceeding approximately four and a half times its maximum diameter, comprising a lower rigid segmental section extending from the bottom laterally to the quarter on both sides and converging at the ends, circumferential members extending over the upper portion and longitudinal members interconnected therewith and converging at each end to a connection with the lower segmental structure, a sole gastight sheathing and constituting the direct buoyant gas-resisting medium for the ship associated with said transverse and longitudinal members, and suspension members extending from the sides of the lower segmental section upward to a plurality of points of attachment on the upper section.

17. An airship having a hull of fore and aft converging lines and substantially circular in cross-section and having a length not exceeding approximately four and a half times its midship diameter, two rigid longitudinal members adjacent the surface of the hull on each lower quarter focusing at each end, upper longitudinal members focusing at each end and secured to the ends of the lower rigid members, contiguous gastight metallic sheathing and constituting the direct buoyant gas-resisting medium for the ship extending from edge-to-edge of the lower rigid members over the top and connected with the upper longitudinal members, and suspenders from the side sheathing and upper longitudinal members to the lower rigid longitudinal members.

18. A metal-clad airship comprising longitudinal members curved throughout their length and focusing at either end, two of said longitudinal members formed of rigid construction and spread amidships to positions approximately not exceeding sixty degrees from the bottom, rigid interconnecting trusses between said rigid members and ballonet diaphragms interconnecting said rigid members a substantial part of the length of the ship and having the metal sheathing constituting the sole buoyant resisting skin of the ship.

19. A metal-clad airship comprising contiguous metal sheathing forming the sole gas-containing envelope, transverse ribs for said sheathing, longitudinal members associated with said ribs focusing at each end of the ship, and a stiff bottom structure below the middle of the ship and of a width amidships slightly less than the beam of the ship having members focusing at each end and connected with the upper longitudinal members, and strain members extending from plural points on the sheathing downward to the edge of the stiff bottom structure and having the metal sheathing constituting the sole buoyant resisting skin of the ship.

20. A metal-clad airship having the metal sheathing constituting the sole buoyant gas-resisting skin, and comprising a contiguous sheet metal hull of substantially circular cross-section, longitudinal members of continuous curvature focusing at each end and of a length not exceeding approximately four and a half times the diameter, trusses forming a rigid lower segment of substantial width amidships and generally conforming to the hull sheathing, end-to-end longitudinal members along the sheathing of the roof and connected at the ends with the lower segmental structure, plurality of gas tight partitions sub-dividing part of the interior for a major length of the ship, and connections with the stiff structure to predetermine and restrict their general position.

21. A metal-clad airship having the metal sheathing constituting the sole buoyant gas-resisting skin, and comprising a complete light-metal sheathing forming a hull of substantially circular cross-section and a length approximating three to four times the diameter amidships, a lower segmental rigid load structure extending from end-to-end associated with the sheathing, and upper longitudinal and transverse members supporting the upper sheathing and rigidly secured to the load structure at each end.

22. A metal-clad airship having the metal sheathing constituting the sole buoyant gas-resisting skin, and comprising a complete light-metal sheathing forming a hull of substantially circular cross-section and a length approximating four times the diameter amidships, a lower segmental rigid load structure extending from end-to-end associated with the sheathing, upper longitudinal and transverse members supporting the upper sheathing constituting a lift section and rigidly secured to the load structure at each end, and suspenders connecting the load structure to a plurality of points on the interior of the lift section.

23. An airship of substantially circular cross-section, two longitudinal trusses extending from end-to-end on each lower quarter of the hull, two longitudinal trusses on each upper quarter of the hull extending from end-to-end and focusing with the lower quarter trusses, suspenders between said upper and lower trusses, and a sole gas enclosing shell of metal sheathing extending throughout the hull above the lower trusses.

24. An airship comprising two rigid longitudinal lower trusses positioned substantially in each lower quarter of the hull, circumferential ribs and longitudinal members connected therewith to form a support for a hull sheathing, power cars including upper cars supported from said longitudinal trusses and means of access to the upper car from said trusses.

25. An airship comprising two main longitudinal trusses positioned substantially at the lower quarter on either side, a superposed complete metallic sheathing enclosing the lift space, fairing separating the main side trusses from the interior lift space, transverse trusses connecting said longitudinal trusses, compartments formed within said trusses and companion-ways in said transverse members.

26. An airship of the character described having separated longitudinal trusses coincident with the skin sheathing positioned substantially on each lower quarter of the hull and away from the bottom meridian and forming separate compartments in each for passengers and goods.

27. An airship of the character described having longitudinal trusses built as a contiguous structure with the hull skin sheathing positioned approximately sixty degrees away from the bottom on each quarter, transverse trusses connecting said longitudinal trusses and forming an enclosed space for occupancy of passengers or goods.

28. A rigid airship having stiff longitudinal trusses on meridian lines of the hull, one side of each such trusses being structurally integral with the hull skin and having contiguous sheathing therewith at each of the lower quarters of the hull and above and laterally away from the keel of the hull.

29. A rigid airship having stiff longitudinal trusses on meridian lines of the hull, one side of each such trusses being structurally integral with the hull skin and extending inside of the sheathing of the hull, and having contiguous sheathing therewith at each of the lower quarters of the hull and above and laterally away from the keel of the hull.

30. An airship of the character described having rigid end-to-end trusses positioned substantially at the lower quarter on either side and converging at the ends to the nose and stern-cap, passenger or goods space in said trusses and a control car formed forward between said trusses, a transverse truss between the longitudinal trusses in proximity to the control car forming a companion-way or communication gallery.

31. An airship having a rigid load section of slightly less breadth amidships than the beam of the hull, buoyant gas-resisting sheathing vaulted above said load section and forming the envelope lift section and skin of the hull, suspension wires from the sides of the load section extending substantially vertical upward to the sheathing of the lift section.

32. In an airship complete buoyancy resisting metallic sheathing, stiff longitudinal trusses in the lower quarters, suspension wires located along the sides of the ship from the lower stiff longitudinal trusses and transmitting the load directly to said outside skin and envelope sheathing above in the same transverse plane.

33. An airship having gastight sole lift-resisting metallic sheathing forming the hull skin, a roof portion and members attached thereto transmitting the lift strains to the upper quarter on each side, suspension wires from the upper quarter of each side to the lower quarter on the same side transmitting the load strains to the lower hull structure.

34. An airship having a stiff lower load segmental structure, a superposed hull sheathing of gastight metal plating constituting the lift-resisting skin and having a longitudinal curved surface, a plurality of longitudinally stiff members associated with said sheathing and interconnected at either end of the ship with the stiff lower structure.

35. An airship of substantially circular cross-section, a hull skin of gastight metal plating forming the primary lift-resisting skin of the ship, two end-to-end longitudinal trusses one in each lower quarter of the ship and having a triangular cross-section with the face of one side of each truss substantially coincident with the skin of the ship and fairing separating the interior of said trusses from the space within the skin.

36. An airship of substantially circular cross-section, a hull skin of gastight metal plating forming the primary lift-resisting skin of the ship, two end-to-end longitudinal trusses separated from each other one in each lower quarter of the ship and having a triangular cross-section with the face of one side of each truss substantially coincident with the skin of the ship, and with the apex of the triangular truss section extending inwardly from the skin of the ship and fairing enclosing the inner side of each truss.

37. A metal-clad airship of substantially circular cross-section throughout the lift space, a plurality of stiff longitudinal members extending from end-to-end of the ship and having a continuous meridian curvature, each of said longitudinal members having a broad face positioned substantially coincident with the sheathing forming the gastight metal-clad lift-resisting skin of the hull surface, and with the other structure portion of the longitudinal member projecting radially toward the centre of the hull.

38. An airship comprising a rigid lower segmental structure, triangular lateral trusses converging at the ends of the ship forming the sides of said rigid structure, a face of each triangular truss forming a section coincident with the skin of the ship respectively on the lower quarter on each side, gastight metal sheathing extending upward from said trusses through the sides and contiguous throughout the roof, generally triangular longitudinal members secured to said metal sheathing each with its broad face adjacent to the metal sheathing and internal stress members interconnecting said generally triangular longitudinal members and said triangular truss members.

39. A metalclad airship of substantially circular cross-section throughout the lift section, a load section, substantially vertical suspender members from the lift section to the load section, triangular circumferential trusses rigidly associated with and following the circular cross-section of the hull skin and airtight fairing covering the inner faces of said trusses.

40. An airship of substantially circular non-deformable cross-section having a gastight envelope forming the hull skin and subject to the lift pressure on the inside and resisting the aerodynamic forces on the outside, means for building up internal pressure of the gas on the inside surface to generally compensate said aerodynamic forces, a plurality of stiff transverse trusses attached to the envelope and conforming to the circular cross-section at a plurality of points in the hull subject to concentration of equipment strains or useful load stresses.

41. An airship having a hull skin consisting of substantially circular cross-section of sheathing throughout the lift portion of the ship, rigid framing cooperating with said sheathing above the suspended load units, interconnections with the metal sheathing and the rigid load-framing, an air chamber confined within the lower portion of the nondeformable sheathing and means for varying the air pressure therein whereby internal and external pressures on the skin due to aerodynamic forces in operation are compensated, and other stresses are carried in the plane of the envelope hull sheathing.

42. A rigid airship comprising a substantially circular cross-sectional nondeformable envelope constituting the gas container throughout the lift portion of the ship and the ship's hull skin throughout, a generally horizontal flexible diaphragm attached to the inside of the skin in the lower portion, and means for increasing the air pressure below said diaphragm to augment the gas pressure above and on the inside of the lift portion of the skin, and means to permit expansion of the gas without strain of the envelope lift section by displacement of the air below the diaphragm, whereby harmful unbalanced pressures are eliminated and the strength of the envelope to resist aerodynamic forces is increased.

43. A dirigible adapted to be moored in contact with the ground, comprising rigid longitudinal and transverse lower structure embodied in the envelope and hull skin, a plurality of resilient bumpers at the extreme lower portions of and connected rigidly with said structure forward and aft of the middle, means of support for a mooring line connected with the longitudinal parts of said rigid structure of the ship in front of the forward bumper and back of the nose.

44. An airship hull having a compartment of substantially circular non-deformable cross-section, comprising a complete metallic sheathing forming the hull skin and the buoyant gas confining envelope, a flexible diaphragm below the middle of the hull having gastight connections on generally horizontal lines to the interior of the hull, a breather to admit air below said diaphragm and means to build up pressure in the chamber below said diaphragm whereby the internal pressure of the gas against the hull skin may be regulated by pressure in said air chamber, for the purpose described.

45. A rigid airship having stiff longitudinal trusses on meridian lines of the hull structurally integral with the hull and one of said trusses embodied at each of the lower quarters of the hull and above and laterally away from the keel of the ship.

46. A rigid airship of substantially circular cross-section, circumferential trusses rigidly associated with and following the circular cross-section of the hull skin, and airtight fairing covering the inner faces of said trusses.

47. A rigid airship having non-deformable self-supporting transverse trusses on circumferential lines of the hull rigidly associated with the hull and forming corridors extending around a substantial portion of the hull.

48. A rigid airship having longitudinal load-carrying trusses on meridian lines of the hull rigidly associated with the hull and one of said trusses embodied and forming the corridor on each of the lower quarters of the hull above and laterally away from the keel of the ship.

In testimony whereof, I have signed my name to this application this 24th day of April, 1923.

RALPH H. UPSON.